United States Patent Office 3,460,969
Patented Aug. 12, 1969

3,460,969
PROCESS FOR PRODUCING MICROPOROUS COATINGS ON A TEXTILE FABRIC
Walter T. Murphy, Cuyahoga Falls, Ohio, assignor to The B. F. Goodrich Company, New York, N.Y., a corporation of New York
No Drawing. Filed Aug. 18, 1965, Ser. No. 480,815
Int. Cl. B44d 1/44; C09d 5/04; B05c 11/02
U.S. Cl. 117—63                                        1 Claim

ABSTRACT OF THE DISCLOSURE

A process is provided for preparing poromeric films and coatings based on certain particular linear polyurethanes. The film spreading is done at higher temperatures than are used in the prior art and employs spreading compositions comprising the linear polyurethanes in solution, said solutions being thixotropically thickened by the addition of certain particular viscosity improving agents.

---

This invention sets forth an improved process for preparing porous films from which porous articles can be made. These porous films can also be applied to various substrates and will serve as porous coatings thereon. A preferred embodiment of the invention relates to a process for preparing unplasticized microporous leather replacements which are supple, abrasion resistant and exhibit great strength.

In recent years increasing attempts have been made to produce vapor permeable polymeric films and coatings. A major use for such materials is as a replacement for leather in clothing, including shoe uppers, in upholstery, and the like. Processes attempted in the prior art to produce leatherlike materials always have sacrificed some important properties such as tensile strength or abrasion resistance to achieve porosity, or have sacrificed porosity to achieve strength or abrasion resistance or some other key property of natural leather.

United States Patent 3,000,757 describes a process of dissolving a polyetherurethane in a hygroscopic solvent, coating the dissolved polymer on a substrate and exposing the structure to a humid atmosphere to remove the solvent and leave the polyetherurethane in the form of a porous film on the substrate. A later patent, 3,100,721, also employs a coating of polyetherurethane dissolved in a hygroscopic solvent but improves the process by first bringing the polymeric solution to a dispersed colloidal state by the addition of a small amount of an inert liquid (usually water) before the coating step. For a 25% concentration of polymer in dimethylformamide, about 2% water, based on total weight of dispersion, is used. For a 10% solution, about 5% water is added. Precipitation of the polymer in a porous state and removal of the solvent is then accomplished by immersing the coated substrate in a material which is a nonsolvent for the polymer, but is miscible with the polymer solvent. A further variation of this prior art process is to add inert liquid to the polymer solution, but only in an amount less than that which will cause a hazy colloidal dispersion to form. This solution is spread on the desired substrate and treated in the manner described above.

These prior art processes are applicable to a variety of polymers including polyetherurethane polymers of various types, to blends of these polymers and vinyl chloride, and, allegedly, to linear polyesterurethane and polyetherurethane polymers made as disclosed in United States Patents 2,871,218 and 2,899,411. These particular polyesterurethanes are elastomers prepared by reacting one mole of polyester having a molecular weight of about 600 to 1200 with about 1.1 to 3.1 mols of a diphenyl diisocyanate in the presence of about 0.1 to 2.1 mols of a glycol containing about from 4 to 10 carbon atoms. The polyesters are hydroxyl-terminated condensation products of 4 to 10 carbon atoms acyclic dicarboxylic acid with a molar excess of 4 to 10 carbon atom alkylene glycol. The particular polyetherurethanes are reaction products of a mixture of about one mole of polyalkyleneether glycol, particularly polytetramethyleneether glycol, having a molecular weight between 800 and 4000 and 0.5 to 9.0 mols of a 4 to 12 carbon atom aliphatic glycol and from about 1.5 to 10.0 mols of a diphenyl diisocyanate. The term "polymer," as used herein denotes a polymeric film-forming material composed of pure polymer or blends thereof with additives such as curatives, coloring agents, plasticizers, fillers and the like.

It has been found, however, that these particular linear polyesterurethanes and polyetherurethanes do not perform satisfactorily in the processes of the prior art patents. When one of these polyesterurethanes is dissolved in dimethylformamide, water is added to the polymeric solution to form a colloidal dispersion, and this dispersion is spread on a nonwoven substrate, immersion of the coated substrate in water produces a porous polymeric coating on the substrate, but the appearance of the coating is not satisfactory. The linear polyesterurethane polymer does not form an attractive, smooth, level surface, but tends to develop valleys and pock marks. The polymer film collapses in spots as the solvent is removed and the surface appearance is uneven and undesirable. When observed in cross section, the film exhibits an extremely nonuniform porous structure with many macropores or oversize voids. Increasing the temperature at which the coating is formed by as much as 10° C. has not provided acceptable microporous films of linear polyurethane polymers. Adding water to the polymer solution in an amount less than that which causes formation of a colloidal dispersion has not checked the tendency of films of this type to collapse and show surface irregularities.

It is known in the art that when one has a solution of a polyurethane polymer in a solvent and, holding the temperature constant, adds an inert liquid, which is a non-solvent for the polymer, but is miscible with the polymer solvent, the inert liquid will, in small amounts, become part of the solution. However, at a critical concentration point the solution will change to a colloidal dispersion and instead of being optically clear, becomes hazy in appearance. This critical point is called the cloud point. It can be shifted by changing the temperature conditions and also by changing the concentration of polymer. If the temperature still remains constant and even more inert liquid is added to the colloidal dispersion, the polymer, which has been transformed from the dissolved state to the dispersed state, next goes into a gel state. The prior art teaches one to form microporous films by spreading on a suitable substrate at room temperature, (1) a true solution of polymer-solvent-inert liquid, (2) a hazy colloidal dispersion or cloud point mixture of polymer-solvent-inert liquid, (3) a gel of polymer-solvent-inert liquid, or (4) the separated gel from (3).

A cloud point solution of polymer-solvent-inert liquid prepared at room temperature (about 22° C.) can be transformed to a true solution by heating it about 4°–5° C. above its preparation temperature. Similarly, a gel solution of polymer-solvent-inert liquid prepared at room temperature can be transformed to a true solution by heating it about 5°–8° C. above its preparation temperature.

It has now been discovered that a satisfactory film with a smooth, glossy surface and uniform microporous structure, as observed in cross section, can be formed on a selected substrate when a linear polyurethane polymer is dissolved in a suitable solvent such as dimethylformamide, spread on the substrate and bathed in an inert liquid (one which is a nonsolvent for the polymer, but which is miscible with the polymer solvent) to remove the solvent, if the mixture of linear polyurethane polymer and solvent therefore cointains (1) an amount of the inert liquid which is substantially greater than the amount of the said inert liquid that produces a hazy, colloidal dispersion when mixed with the polymer solution at room temperature, that is, an amount of inert liquid greater than the amount which brings the polymer-solvent-inert liquid mixture to its cloud point, and (2) a particular type of thickening agent which thickens the solution thixotropically. If one starts with 15%–25% by weight solutions of linear polyurethane in dimethylformamide, then an amount of inert liquid (1) equal to 5% to 70% by weight of the polyurethane is added along with (2) 2% to 15% by weight of the polyurethane of a thixotropic thickening agent. Coating temperatures range from 45° C.–70° C. when water is used as the inert liquid. The temperature of 45° C. is the minimum coating temperature consistent with good cell structure in the microporous film. Further, the coating composition of (1) linear polyurethane polymer, (2) solvent therefore, (3) inert liquid and (4) thixotropic viscosity improver must not be in the form of a gel or even a colloidal dispersion, but must be a true solution. This condition is achieved by making a cloud point mixture, which is a colloidal dispersion, at about 15° C. above room temperature and then raising the temperature of the dispersion sufficiently high to cause the dispersion to revert to a true solution, but keeping said temperature lower than the boiling point of either the solvent or the inert liquid in order to keep these fluids from escaping and thereby changing the polymer concentration. Usually when the polymer-solvent-inert liquid mixture has been brought to the cloud point by the addition of inert liquid at a given temperature, a rise of 5° C. in temperature will be sufficient to cause the colloidal dispersion to revert to a true solution. The hot polymer solution, which would be a colloidal dispersion or a gel at the coating temperatures shown in the prior art, is then spread on a suitable substrate at the elevated temperature. When, for a given polymer concentration and a given temperature, say 45° C., one has already determined the amount of inert liquid to be used to form the cloud point solution, one can mix the ingredients directly at the higher temperature that will be used for the coating step. It should be noted that the amount of inert liquid employed is not the amount that will create the cloud point condition at the temperature to be used for coating, but is the somewhat lower amount that creates this condition at a temperature about 5° C. lower than the temperature to be used for coating. The practice of this invention requires that the step of coating the linear polyurethane polymer solution in the mixture of solvent-inert liquid be accomplished at higher temperatures than such step is usually done in the prior art. The coating temperature may range from about 20° C. above room temperature to one enough below the boiling point of the lowest boiling liquid in the solution to avoid evaporative loss of fluid. If the linear polyurethane is in a 15%–25% solution by weight in dimethylformamide and water is the inert liquid employed, the maximum range of coating temperature is 45° C.–70° C. and the preferred range is 45° C.–65° C. The cast film, or film plus substrate, is immersed in a bath of water or other inert fluid for 120 to 180 minutes at 12° C. to 30° C. to extract essentially all of the solvent. The structure is then dried 15 to 25 minutes at about 100° C. to remove the inert liquid and any remaining solvent. In order to reduce the time needed for extraction of the solvent, it is possible to first immerse the film, or film plus substrate, in the 12° C. to 30° C. water bath for two minutes, then in a hot water bath at 40° C. to 60° C. for 15–30 minutes.

A critical feature of the invention is the addition to the linear polyurethane solution before it is coated on the substrate, of one of a particular class of thickening agents or viscosity improvers that have a unique effect on the viscosity of the polymer solution. These agents increase the viscosity of the polymer solution thixotropically. Certain additives, which tend to improve the properties of the thickening agents, are combined therewith. These additives contribute significantly to the overall excellence of properties in the finished coating. Within limits (1–50 parts per hundred parts of linear polyurethane) the greater the amount of thickening agent, the higher will be the viscosity of the polymer solution and the thicker will be the maximum wet film that can be spread on the substrate at one pass.

Hygroscopic solvents useful in preparing the polyurethane solutions used in this invention include dimethylsulfoxide, dimethylformamide and dimethylacetamide. Fluid nonsolvents for the polymer that are miscible with these solvents for the polyurethanes and form cloud point solutions therewith include water, ethylene glycol, propylene glycol, glycerol and lower alkyl alcohols. It is understood that dimethylformamide is the preferred solvent and water is the preferred inert liquid in the practice of this invention. If other solvents and inert liquids are used, the preferred polymer concentrations, the cloud point temperatures, and the preferred amounts of materials will vary from the values shown in the following discussion. These preferred amounts of alternate materials and the like, are, however, readily ascertainable to one skilled in the art and following the general procedures set forth below.

Linear polyurethane solutions of 5% to 35% total polymer solids may be used with 15% to 25% total solids preferred. The use of about 35% polymer gives films with low porosity and moisture vapor transmission. The use of below 5% polymer gives films of low strength. The amount of inert liquid employed is generally 5% to 70% by weight of the polyurethane polymer present, and also amounts to 1% to 15% by weight of the total solution. From 2% to 15% of a thixotropic thickening agent, based on the weight of polyurethane polymer, is added to the polymer solution or dispersion. Stated as a function of the weight of the total solution, the proportion of thickening agent amounts to 0.2% to 2.5%. Wet film thicknesses of 20 mils to 50 mils, comparable to 8 mils to 20 mils of dry film, can be spread on the substrate, with 30 to 40 mils preferred.

The thickening agent employed in this invention has to be compatible with the linear polyurethane polymer and with the polymer solvent, generally dimethylformamide, employed. The desired thickening agents have the unique power with these particular solutions of linear polyurethanes of not only increasing the viscosity of the solution as measured with a Brookfield viscosimeter, but of increasing the viscosity thixotropically. This thixotropic effect is observed by the fact that when the Brookfield viscosimeter spindle is rotated at low speed, a high voscity is registered; when the spindle is rotated in the same solution at the same temperature at a higher speed, a lower viscosity is registered. This is evidence of an isothermal gel-sol-gel condition upon agitation and subsequent rest which is defined as thixotropy.

Addition of 12.5 parts of polyvinylchloride resin, for instance, to a solution of 20 parts linear polyesterurethane polymer, 77 parts dimethylformamide, and 3 parts water will serve to increase the viscosity of the solution, but in a normal manner, not a thixotropic one, as evidenced by the fact that as the spindle speed or shear rate is increased at a constant temperature, the indicated viscosity steadily increases. High viscosity solutions of this type, such as can be made using methyl cellulose, polyvinyl alcohol and copolymers of methyl vinyl ether and maleic anhydride as the thickeners, do not form acceptable coated substrates and the surfaces produced from such linear polyurethane solutions are found to be rough and lumpy, not leatherlike in appearance. It is believed that when a thixotropically thickened wet film of linear polyurethane is spread on a surface or substrate, the wet film is truly self-supporting as the subsequent bath of inert fluid extracts the polymer solvent and precipitates the polymer in the form of uniformly dense micropores when seen in cross section. The presence, in the practice of this invention, of an unusually large amount of inert liquid in the spread wet film is believed to contribute to precipitation of linear polyurethane polymer from within the wet film, so that the precipitated film exhibits an extremely fine and uniform microporosity.

The particular thickening agents which have the power to thixotropically increase the viscosity of a solution of linear polyurethane polymer in a dimethylformamide-water mixture are carboxy vinyl polymers, sodium carboxy methyl cellulose, polyacrylate salts, and, most preferred, pyrogenic silicas. A typical pyrogenic silica has a particle size of 0.015 micron, surface area of 200 m.$^2$/g. and a bulk density of 2.2 lb./c.f. As these particular viscosity improvers achieve their viscosity raising effect by hydrogen-bonding of hydroxyl groups on the viscosity improver surface with nitrogen or oxygen atoms in organic liquids, the thickening effect of a given amount of viscosity improver often is further improved by the addition of a small amount of a polar liquid and cationic or non-ionic additives. These additives compel the viscosity improver chains to link together. The chains migrate toward each other because of the attractive forces between the additive attached to the viscosity improver and the liquid system. The result is that hydroxyl groups on the viscosity improver surface lock together by hydrogen bonding, thereby ultimately gelling the liquid. Typical polar liquids that can be employed with the thixotropic viscosity improvers include lower alkyl alcohols such as methanol, ethanol, propanol, and butanol, lower alkyl acetates such as ethyl acetate, and butyl acetate, lower alkylene glycols such as ethylene glycol, glycerol, lower alkyl ketones such as acetone, and methyl ethyl ketone, and acetic acid. Cationic additives include octadecyl trimethyl ammonium chloride, soy trimethyl ammonium chloride, and 1-(2-hydroxy ethyl-2-heptadecenyl-2-imidazoline and non-ionic additives include isooctylphenyl polyethoxy ethanol, alkyl polyoxyalkylene ethers and polyoxyethylene sorbitol oleate. It has been found that a mixture of 73.5% fine, pyrogenic silica (12.5 parts), 11.8% glycerol (2.0 parts) and 14.7% of octadecyl-trimethyl ammonium chloride (2.5 parts) added to 100 parts of a linear polyesterurethane dissolved in 565–186 parts dimethylformamide and sufficient water to form the cloud point solution provides excellent thixotropic increase in viscosity of the polymer solution to allow wet spreading of 40–60 mil films on substrates such as glass, metal, and woven and nonwoven fabric batts. These proportions of silica, polar liquid and cationic additive in the viscosity improver are not critical in themselves, but may be varied several percent either way. A major portion, preferably at least 60% by weight of the thickener, should be the primary agent, the pyrogenic silica. The balance of the batch may be allocated between the polar liquid additive and the cationic additive in roughly equal proportions. It is even possible to eliminate one of the additives entirely, but at least one, preferably both, should be present with the silica to give the ultimate properties in the final microporous coating. When pyrogenic silica is used as the viscosity improver, the preferred amount to use is 12% to 14% by weight of polyurethane polymer present. When a carboxy vinyl polymer is used as the viscosity improver, the preferred amount to use is 1% to 2% by weight of polyurethane polymer present.

The following examples will serve to illustrate the invention.

Example I

A linear polyesterurethane polymer is prepared by following the teaching of Patent 2,871,218. First 1000 g. (1.0 mol) of hydroxyl poly(tetramethylene adipate) molecular weight 1000, hydroxyl number 112, acid number 2.5, and 180 g. (2.0 mols) of butanediol-1,4 are mixed in a heated autoclave with stirring for 15 minutes at 10 mm. pressure at 100°–105° C. Next 750 g. (3.0 mols) of diphenylmethane-p,p'-diisocyanate are added and stirred for 2 minutes. The melt is poured into lubricated metal trays and held in an oven at 140° C. for 3 hours.

Twenty parts of this polyesterurethane are dissolved in 80 parts of dimethylformamide. Viscosity is measured at 25° C. and various rotation speeds with a Brookfield viscosimeter, using No. 5 white. Over a wide range of spindle speeds, the viscosity value remains essentially the same, but increases steadily as spindle speed increases. This is what is normally observed when measuring a solution viscosity with Brookfield and similar type viscosimeters.

| Spindle speed, r.p.m.: | Viscosity in centipoises |
|---|---|
| 5 | 4000 |
| 10 | 5000 |
| 25 | 5280 |
| 50 | 5520 |

One hundred parts of the polyesterurethane are dissolved in 400 parts dimethylformamide and 12.5 parts of Cab-O-Sil, a pyrogenic silica powder with particle size 0.015 micron, surface area 200 m.$^2$/g. and bulk density 2.2 lb./c.f. are added along with 2.0 parts of glycerol and 2.5 parts of octadecyl-trimethyl ammonium chloride. Again the viscosity is measured at various speeds with the No. 5 spindle at 25°. C.

| Spindle speed, r.p.m.: | Viscosity centipoises |
|---|---|
| 10 | 14,240 |
| 20 | 12,300 |

The viscosity value of the linear polyurethane polymer solution is much greater than that of the unthickened solution. The decrease in viscosity as spindle speed increases is indicative of a thixotropic increase in viscosity from that of the original polymer solution.

A 40 mil wet thickness coating of this thickened solution is spread on a woven cotton sheeting substrate at 25° C. and immersed in a water bath for 15 minutes at 30° C. The warmer the temperature of the inert liquid bath, the faster is the coagulation and precipitation of the polyurethane polymer coating by extraction of the dimethylformamide. After drying, the coating is a white, opaque, smooth, glossy film. The coating thickness is 20 mils and the moisture vapor transmission (MVT) is 138% that of a control sample of 4 oz. calfskin. This level of MVT indicates a microporous film has been formed, but when the film is cut and the cross section is observed, the pores are found to be nonuniform in size and shape and there are numerous oversize (macroporous) pores.

Example II

The following series of recipes is made up into solutions, proportions being measured in parts by weight. Brookfield viscosity is measured with No. 5 spindle at 25° C. except for part E which is a dispersion or gel at room temperature and is heated to 65° C. to form a true solution for coating. A wet film is spread on a woven cotton sheeting at room temperature for parts A–D; at 65° C. for part E. The structure is washed in water to create a microporous structure by precipitation of polymer and removal of solvent and dried.

| Ingredient | Recipe | | | | |
|---|---|---|---|---|---|
| | A | B | C | D | E |
| Dimethylformamide | 300 | 300 | 300 | 300 | 300 |
| Pyrogenic silica | | 12.5 | 12.5 | 12.5 | 12.5 |
| Glycerol | | | 2.0 | 2.0 | 2.0 |
| Octadecyl-trimethyl ammonium chloride | | | | 2.5 | 2.5 |
| Water | | | | | 33.8 |
| Viscosity at— | | | | | |
| 2.5 r.p.m | 11,680 | 50,550 | 42,400 | 48,000 | |
| 5 r.p.m | 11,680 | 41,600 | 34,000 | 38,800 | |
| 10 r.p.m | 11,800 | 35,350 | 28,140 | 32,550 | |
| Thickness of dry film in mils | 15 | 18 | 20 | 21 | 18 |
| Density of dry film in g./cc | .37 | .582 | .532 | .473 | .496 |
| Comment on dry film | (1) | (2) | (3) | (3) | (4) |

[1] Dull, rough, lumpy macroporous.
[2] Dull, smooth, nonuniformly microporous.
[3] Glossy smooth, nonuniformly microporous.
[4] Glossy smooth, fine uniform porosity.

Film E will make an excellent upholstery material. Films B and E run 990,000 flexes without cracking on the Bally flexometer. Film E has an MVT of 995 g./m.$^2$/24 hours compared to an MVT of 500 g./m.$^2$/24 hours for a 4 ounce calfskin leather control as measured by Federal Specification on Leather Methods of Sampling and Testing, KK–L–311A, method 8011.

Example III

A linear polyalkyleneetherurethane polymer is prepared by following the teaching of Patent 2,899,411. First 1028 g. (1.0 mol) of dry, water extracted, hydroxyl poly (tetramethylene oxide), molecular weight 1028, and 270 g. (3.0 mols) of butanediol-1,4 are melted in a kettle and stirred for about 20 minutes at a pressure of 5 to 6 mm. at 105° C. to remove moisture. To the dried mixture is then added 1000 g. (4.0 mols) of diphenylmethane-p, p′-diisocyanate and the mix is stirred for one minute and poured into a sealed container and placed in 140° C. oven for 3.5 hours.

The polyetherurethane is made into solutions employing the following recipes. Brookfield viscosity is run with No. 5 spindle at 25° C. for A–D, at 65° C. for E. Parts are in parts by weight. A wet film is spread on woven cotton sheeting at room temperature for A–D; at 65° C. for E. The structure is washed in water 30 minutes at 30° C. to create a porous film by precipitation of polymer and removal of solvent, and dried.

ined in cross section under 30×magnification.

| Ingredient | Receipe | | | | |
|---|---|---|---|---|---|
| | A | B | C | D | E |
| Polyetherurethane | 100 | 100 | 100 | 100 | 100 |
| Dimethylformamide | 566 | 566 | 566 | 566 | 566 |
| Proygenic silica | | 12.5 | 12.5 | 12.5 | 12.5 |
| Glycerol | | | 2.0 | 2.0 | 2.0 |
| Octadecyl-trimethyl ammonium chloride | | | | 2.5 | 2.5 |
| Water | | | | | 6.3 |
| Viscosity at— | | | | | |
| 20 r.p.m | 2,060 | 2,840 | 3,700 | 3,880 | 3,683 |
| 50 r.p.m | 2,070 | 2,744 | 3,570 | 3,512 | 1,733 |
| 100 r.p.m | 2,080 | 2,664 | 3,480 | 3,320 | 1,124 |
| Thickness of dry film in mils | 10 | 12 | 8 | 29 | 18 |
| Density of dry film in g./cc | .530 | .525 | .593 | .204 | .328 |
| Comment on dry film | (1) | (1) | (1) | (2) | (3) |

[1] Rough, partial collapse.
[2] Smooth, glossy nonuniform microporosity.
[3] Smooth, glossy uniform microporosity.

Linear polyetherurethane films give the most leatherlike smooth, glossy, uniformly microporous structure when precipitated from polymer solutions thixotropically thickened and containing a high amount of inert liquid. Film E has the most uniform cell structure when examined.

Example IV

Polyesterurethane from Example I is made up into the following coating recipe:

| Ingredient: | Parts |
|---|---|
| Polyesterurethane | 100 |
| Dimethylformamide | 400 |
| Pyrogenic silica | 12.5 |
| Glycerol | 2.0 |
| Octadecyl-trimethyl ammonium chloride | 2.5 |
| Water | 50.0 |

The polyesterurethane is first dissolved in 337.5 parts of dimethylformamide. The pyrogenic silica is dispersed in the water and the balance of the dimethylformamide in an Eppenbach homogenizer and added to the polyesterurethane solution at 60° C. The octadecyl-trimethyl ammonium chloride and glycerol are then added with stirring at 60° C. The cloud point of this mixture is 50° C. At 65° C. the mixture is a true solution.

A wet film of this mix is spread on a woven cotton sheeting substrate at 65° C. The polymer is precipitated to a microporous structure by bathing in a water bath at 30° C. until the dimethylformamide is removed. The film is dried for 30 minutes at 100° C.

The dried film is 18 mils thick, has a density of 0.425, and is smooth, and uniform in porosity through entire thickness, as observed under 30×magnification in microphotographs and has an MVT of 1156 g./m.$^2$/24 hours. It makes an excellent breathable upholstery material.

I claim:

1. An improved process for producing uniformly microporous films and coatings which comprises (A) forming a coating composition comprising (1) 15%–25% by weight of a polymer selected from the group consisting of essentially linear polyesterurethanes and polyetherurethanes wherein said polyesterurethanes are elastomers prepared by reacting one mol of polyester having a molecular weight of 600–1200 with about 1.1 to 3.1 mols of a diphenyldiisocyanate in the presence of about 0.1 to 2.1 mols of a glycol containing about from 4 to 10 carbon atoms, said polyester being a hydroxy-terminated condensation product of a 4 to 10 carbon atom acyclic dicarboxylic acid with a molar excess of a 4 to 10 carbon atom alkylene glycol, and the said linear polyetherurethanes are reaction products of a mixture of about 1 mol of polyalkyleneether glycol having a molecular weight between 800 and 4000 and 0.5 to 9.0 mols of a 4 to 12 carbon atom aliphatic glycol and from about 1.5 to 10.0 mols of diphenyldiisocyanate, (2) 65% to 80% by weight of a solvent for said polymer selected from the group consisting of dimethylsulfoxide, dimethylforamamide and dimethylacetamide, (3) 1% to 15% by weight of an inert liquid, said inert liquid being present in at least an amount sufficient to bring the mixture of polymer, solvent and inert liquid to its cloud point at the temperature of mixing, said temperature being in the range 37° C.–90° C., plus (4) 0.2% to 2.5% by weight of the mixture of said polymer, solvent and inert liquid of a thixotropic viscosity improver, said viscosity improver comprising a member of the group consisting of carboxy vinyl polymers, sodium carboxy methyl cellulose, polyacrylate salts and finely divided pyrogenic silicas in combination with 1.0%–20% by weight of the said viscosity improved of a polar liquid selected from the group consisting of lower alkyl alcohols, lower alkyl acetates, lower alkylene glycols, lower alkyl ketones, and acetic acid and from 1.0%–20% by weight of the said viscosity improver of a surfactant additive selected from the group consisting of cationic and non-ionic additives, (B) heating said cloud point mixture to a temperature about 5° C. higher than said mixing temperature, thereby causing said cloud point dispersion to become a true solution, (C) coating said composition at said higher temperature on a substrate, (D) immersing said coated substrate in a bath of an inert liquid for 120 to 180 minutes at 12° C. to 30° C. whereby to extract essentially all of said solvent, and (E) drying said coated substrate at 100° C. to remove substantially all the inert liquid and any unextracted solvent.

References Cited

UNITED STATES PATENTS

| 3,100,721 | 8/1963 | Holden | 117—135.5 |
| 3,169,885 | 2/1965 | Golodner et al. | 117—135.5 |
| 3,208,875 | 9/1965 | Holden | 117—135.5 |

WILLIAM D. MARTIN, Primary Examiner

T. G. DAVIS, Assistant Examiner

U.S. Cl. X.R.

117—102, 135, 143, 161

UNITED STATES PATENT OFFICE
CERTIFICATE OF CORRECTION

Patent No. 3,460,969                                  August 12, 1969

Walter T. Murphy

It is certified that error appears in the above identified patent and that said Letters Patent are hereby corrected as shown below:

Column 5, line 52, "yl-2-heptadecenyl-" should read -- yl)-2-heptadecenyl- --. Column 6, line 22, "white" should read -- spindle --.

Signed and sealed this 12th day of May 1970.

(SEAL)
Attest:

Edward M. Fletcher, Jr.                               WILLIAM E. SCHUYLER, JR

Attesting Officer                                            Commissioner of Patents